United States Patent [19]

Haag

[11] Patent Number: 5,053,256
[45] Date of Patent: Oct. 1, 1991

[54] SODIUM HYPOCHLORITE SURFACE TREATMENT TO IMPROVE THE ADHESION OF PAINTS TO POLYDICYCLOPENTADIENE

[75] Inventor: Harold F. Haag, New Castle, Del.

[73] Assignee: Hercules Incorporated, Wilmington, Del.

[21] Appl. No.: 266,954

[22] Filed: Nov. 3, 1988

[51] Int. Cl.$^5$ ................................................ B05D 3/10
[52] U.S. Cl. ..................................... 427/307; 427/444
[58] Field of Search ................................ 427/367, 444

[56] References Cited

U.S. PATENT DOCUMENTS 2,668,134  2/1954  Horton ................................ 427/444
3,561,995  2/1971  Wu et al. ............................. 427/444
4,835,016  5/1989  Rosty et al. ......................... 427/307

FOREIGN PATENT DOCUMENTS 720390  11/1966  Italy .

Primary Examiner—Janyce Bell
Attorney, Agent, or Firm—Mark Goldberg

[57] ABSTRACT

A method of improving the paint adhesion properties of a cycloolefin polymer article comprising exposing the surface of said article to a solution of sodium hypochlorite or a solution of potassium permanganate. Preferably the solution is of sodium hypochlorite and it further contains a detergent solution.

7 Claims, No Drawings

SODIUM HYPOCHLORITE SURFACE TREATMENT TO IMPROVE THE ADHESION OF PAINTS TO POLYDICYCLOPENTADIENE

FIELD OF THE INVENTION

This invention relates to a method of increasing the adhesion of paint films to the surfaces of molded articles made from cycloolefin polymers. This invention especially relates to the application of a dilute solution of sodium hydrochlorite to the surface of the molded article prior to the application of paint.

BACKGROUND OF THE INVENTION

Molded articles made from cycloolefin polymers such as thermoset poly(dicyclopentadiene), the preparation of which is described in U.S. Pat. No. 4,400,340, are typically painted with a topcoat such as a white acrylic-urethane enamel. It has been found that in many instances poly(dicyclopentadiene) articles demonstrate poor ability to retain paint coatings. It is highly desirable for products made from this polymer to be painted, both to withstand degradation and for aesthetic reasons. In addition, a painted surface reduces any objectionable odor produced by unreacted dicyclopentadiene (DCPD) monomer remaining in the polymer. It has been known to treat polymers made from this monomer with a wash to reduce this odor. However, heretofore it has not been known that a surface treatment of sodium hypochlorite would increase the paint adhesion properties of dicyclopentadiene polymers.

In Japanese published patent application 62201940, dated Sept. 5, 1987, molded products were treated with a water solution of acidic, basic and/or amphoteric compounds to remove the residual odor of the dicyclopentadiene monomer in the polymer. Specifically, a solution of sulfuric acid was used.

Orlov, et al. in U.S. Pat. No. 3,869,303 discloses a method of surface modification of synthetic rubbers with an aqueous solution of a mineral acid, a mineral oxidant such as potassium permanganate and sodium perchlorate, and a salt of hydrochloric, hydrobromic or hydroiodic acid.

Jyo, et al. in U.S. Pat. No. 3,968,316 disclosed a surface treatment of synthetic resin containing ethylenic unsaturation by an alkyl hypohalite and a compound containing an active hydrogen and a functional group such as t-butyl hypochlorite in t-butyl alcohol.

In British Patent No. 1,396,090, dated May 29, 1975 a surface treatment of shaped, unsaturated rubber articles was disclosed which increased the articles bondability to other surfaces or a coating. The treatment was by contacting the rubber article with an alkyl hypohalite or a halogen-substituted alkyl hypohalite.

In Italian Pat. No. 720,390, a method of treating the surface of polyethylene or polypropylene was shown which increases the adhesion of the polymer to leather articles. The treatment was by a strong oxidizing agent selected from potassium dichromates or permanganates, potassium or calcium perborates, chlorites or hypochlorites or sodium peroxide.

Since it was found that in the production of molded poly(DCPD) articles that many such articles had poor paint adhesion properties, a solution was sought. One solution was the pretreatment of the parts with an adhesion promoting primer consisting of chlorinated polyolefin and ethylenevinylacetate copolymer. The pretreatment did promote excellent levels of paint adhesion, but it was only a temporary solution due to the significant added expense of the adhesion promoter and the additional manhours necessary for this pretreatment step. A study of the problem revealed that as polymer articles aged, the paint adhesion characteristics improved. However, it would be impractical to wait several weeks between the molding and painting steps. It was found that as molded articles aged the degree of surface oxidation increased and that there was a direct correlation between the degree of surface oxidation and paintability, with greatly improved adhesion of paints to the oxidized surfaces. Antioxidants had been added to the precursors of the polymer to maintain other properties, but it seemed that it would be necessary to promote oxidation in the surface of the article in order to improve paint adhesion. One approach to achieving oxidation of the surface of the article was to bake the item for a period of time. However, this did not increase the paint adhesion properties. This approach may not have been expected to improve paint adhesion properties since the articles demonstrating poor paint adhesion had passed through ovens at 160° F. before application of the paint as well as a heated zone of up to 160° F. after paint application. Heat alone did not change the surface of the polymer sufficiently to improve paint adhesion.

An aqueous solution of potassium permanganate was found to improve the adhesion of paints when applied to the molded articles. The potassium permanganate would be useful for certain applications, but due to the potential handling problems in the production facility, it was considered to be desirable to pursue alternative methods of improving the paint adhesion. A 30% solution of hydrogen peroxide was found not to improve the paint adhesive properties of the polymer. A method found to significantly improve paint adhesion was to expose an article to light in the ultraviolet range before applying the paint. Exposure to both high and low intensity ultraviolet light greatly improved the paint adhesion properties of the polymer. However, the introduction of ultraviolet lamps into the production line would require additional processing time and space. An inexpensive solution to the problem was needed which would not interfere with the production procedures. Such a solution has been found in this invention through the application of a solution of sodium hypochlorite to the article's surface before it is sent through the painting operation.

SUMMARY OF THE INVENTION

It has now been found that a solution of sodium hypochlorite applied to the surface of molded articles made from cycloolefin polymers will promote paint adhesion to such articles. About 0.5% to 5.0% sodium hypochlorite is in solution in water. Preferably, a 0.5% to 2% concentration of the sodium hypochlorite is dissolved in an aqueous solution of a detergent. The detergent increases the effectiveness of the sodium hypochlorite solution at lower concentrations than would be otherwise necessary if the sodium hypochlorite were to be dissolved in water without the detergent due to improved surface wetting properties.

DETAILED DESCRIPTION OF THE INVENTION

The sodium hypochlorite surface treatment of this invention is applied to molded articles made from cycloolefin polymers. Typical of such cycloolefin polymers are thermoset poly(dicyclopentadiene) and copolymers of DCPD with other cycloolefins. Without the surface treatment, paint adhesion is poor on many such molded polymer articles, with the paint susceptible to coming loose from the polymer surface in large pieces.

Several factors contribute to the success of this surface treatment method. The first factor is the ease of application of the solution containing the sodium hypochlorite. In normal practice, a molded article is washed with a detergent solution prior to it being painted. It does not add any production steps to the manufacture of such molded articles to add a quantity of sodium hypochlorite to the detergent solution. In addition, when compared to other means of increasing paint adhesion, the process of this invention does not introduce any further environmental hazard into the workplace. Interestingly, although one of the reasons for applying the paint to the polymer is to prevent oxidation, some degree of surface oxidation is necessary for paint to adhere satisfactorily.

The sodium hypochlorite surface treatment can be applied to the cycloolefin polymer article by any method commonly used in the art including brushing, applying with an absorbent pad, spray-washing or dipping. It is preferred to apply the sodium hypochlorite with an absorbent pad as it provides greater control over the volume of liquid applied to the surface which must be subsequently rinsed and dried prior to the painting step. The sodium hypochlorite is available commercially as a 5.25% weight percent aqueous solution. It is normally diluted for use in this invention. A concentration of about 0.5% to 5.0% may be used with a concentration of from about 1.0% to 2.5% sodium hypochlorite preferred, although experimental data shows that a concentration in water as low as 0.525% sodium hypochlorite can provide marginally satisfactory results while a 0.525% concentration in a detergent solution provided excellent results. The preferred concentration range of sodium hypochlorite in the detergent solution ranges from about 0.5% to about 2.0%. In this specification all parts and percentages are by weight unless otherwise noted. The following examples are illustrative of this invention and are not intended to limit its scope in any way.

EXAMPLE 1

An aqueous solution of sodium hypochlorite is prepared. An approximately 5% aqueous solution (sold under the trademark Clorox at an undiluted concentration of 5.25%), is diluted in water to a 2.5% level. (For ease in calculations, the original undiluted concentration has been rounded to 5%, with other calculations rounded to the nearest 0.5%). Throughout the tests of paint adhesion, one-half of a molded poly(DCPD) article was treated with the solution while the other half of the article was wrapped tightly in aluminum foil to prevent experimental results from being influenced by exposure to any volatile elements in the solution. This experimental procedure was necessary since it had been found that even within a group of samples gathered from the same production run there was a wide deviation from sample to sample as to the paint adhesion properties. It was consistently found that the treated half of the poly(DCPD) article demonstrated excellent paint adhesion properties while the half wrapped in aluminum foil of the article demonstrated very poor paint adhesion properties.

Paint adhesion was measured by ASTM standard D3359-83. The basis of the method is the adhesion of the coating to the substrate after a lattice pattern is cut through the coating. A pressure-sensitive adhesive tape with adhesion strength of approximately 45 g/mm width is pressed down over the lattice cut and then removed. The approximate amount of coating removed determines the adhesion rating which ranges from 5B for no detachment to OB for greater than 65% detachment. However, since the lowest classification under that standard was for a peeling level of over 65%, an additional classification was created for the experiments performed to indicate where substantially all of a paint film peeled off upon performance of the test or where the samples displayed gross amounts of peeling even in uncut sections. A total of four sets of tests were run. Five poly(DCPD) articles were manually wiped with 5% NaOCl. Five articles were treated in the same manner with a 1:3 dilution of the 5% NaOCl to water (1.67% NaOCl). The NaOCl remained on the surface of the article for 40 minutes before it was removed at the washing station. Five articles were treated with 2.5% NaOCl which had been prepared by diluting the 5% NaOCl 1:1 in a standard detergent solution. Another group of five articles were treated with a 1:3 dilution of the 5% NaOCl in the detergent solution to produce a solution having a NaOCl concentration of 1.67%. Five articles was treated with a 0.5% NaOCl concentration in detergent solution. All of the first group of articles exhibited excellent paint adhesion properties. The articles treated in the 1:3 dilution in water exhibited inconsistent paint adhesion properties ranging from poor to excellent while the group of samples untreated with NaOCl exhibited gross levels of paint peeling. The two sets of articles treated with the 2.5% and 1.67% dilutions of NaOCl in the detergent solution exhibited excellent paint adhesion properties. Even the lowest concentration of NaOCl at the 0.5% level in detergent exhibited excellent paint adhesion.

The detergent used was Oakite Liqui-Det (manufactured by Oakite Products, Berkeley Heights, N.J.). The active ingredients of the detergent include diethylene glycol butyl ether, ethoxylated cocoamine, dodecylbenzene sulfonic acid, ethanolamine and sodium acid pyrophosphate. The detergent is diluted, six fluid ounces of concentrated detergent in five gallons of water. The detergent solution is mixed with a 5.25% sodium hypochlorite solution at a 4:1 ratio to produce a solution which is about 1% sodium hypochlorite. Other types of detergents may be used as long as the dilute solution of detergent used is not easily oxidized by NaOCl and does not react with the NaOCl to produce any hazardous gases.

Other features, advantages and specific embodiments of this invention will become readily apparent to those exercising ordinary skill in the art after reading the foregoing disclosures. In this regard, while specific embodiments of this invention have been described in considerable detail, variations and modifications of these embodiments can be effected without departing from the spirit and scope of the invention as disclosed and claimed.

What is claimed is:

1. A method of improving the paint adhesion properties of a cycloolefin polymer article, wherein said cycloolefin comprises dicyclopentadiene, comprising exposing the surface of said article to a aqueous solution of sodium hypochlorite or a solution of potassium permanganate.

2. The method of claim 1 wherein the surface of said article is exposed to a solution of sodium hypochlorite.

3. The method of claim 2 wherein the solution of sodium hypochlorite consists of from about 1% to about 5% sodium hypochlorite in water.

4. The method of claim 3 wherein the solution of sodium hypochlorite consists of from about 1.0% to about 2.5% sodium hypochlorite.

5. The method of claim 2 wherein said solution comprises in addition a detergent.

6. The method of claim 5 wherein said solution of sodium hypochlorite comprises from about 0.5% to about 5% sodium hypochlorite.

7. The method of claim 6 wherein said solution of sodium hypochlorite comprises from about 0.5% to about 2% sodium hypochlorite.

* * * * *